Sept. 11, 1923.

J. J. BOSSHARD 1,467,304

AUTOMATIC SCREW MACHINE

Filed July 23, 1920

INVENTOR,
John J. Bosshard
by Henry Plech
Attorney.

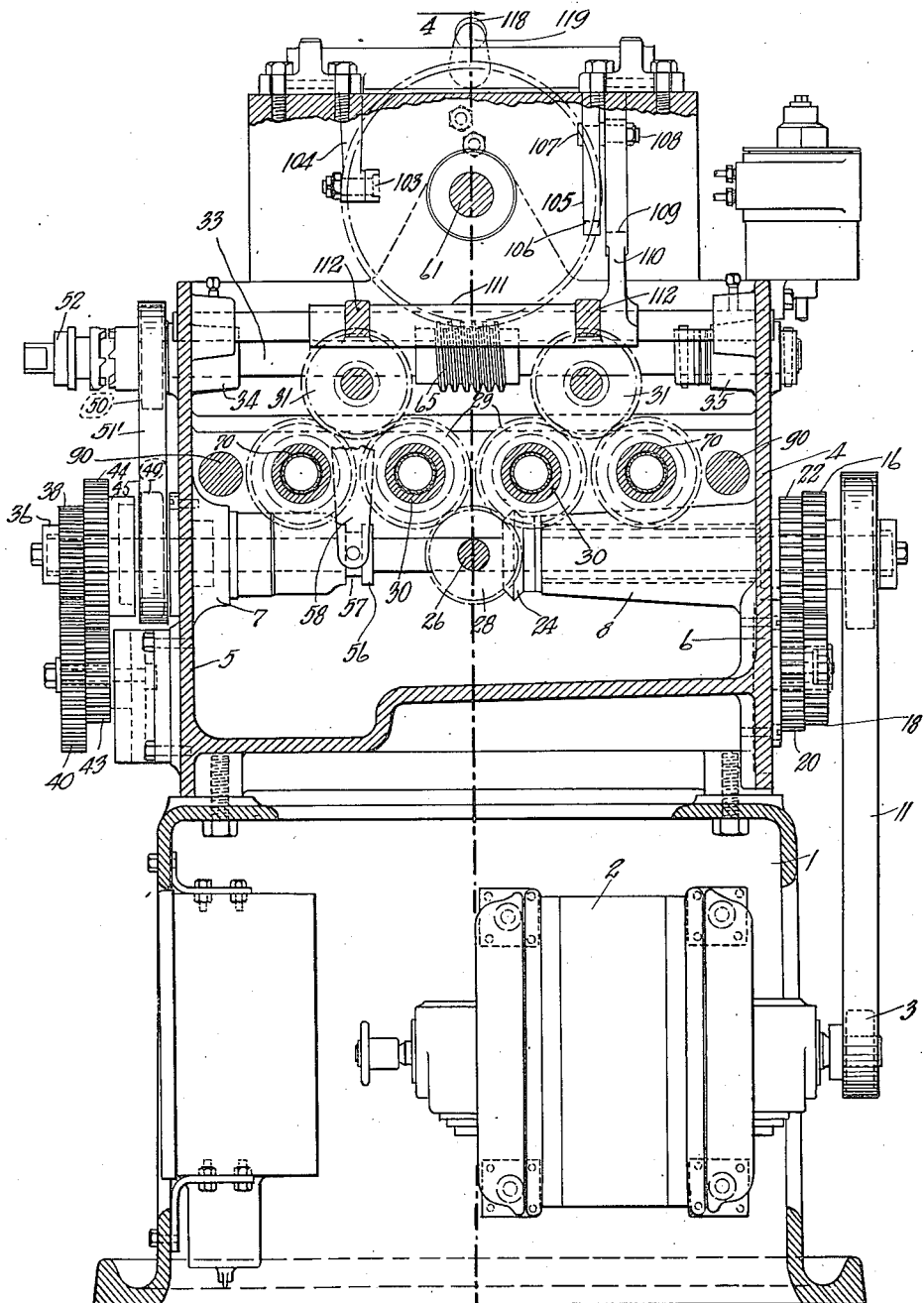

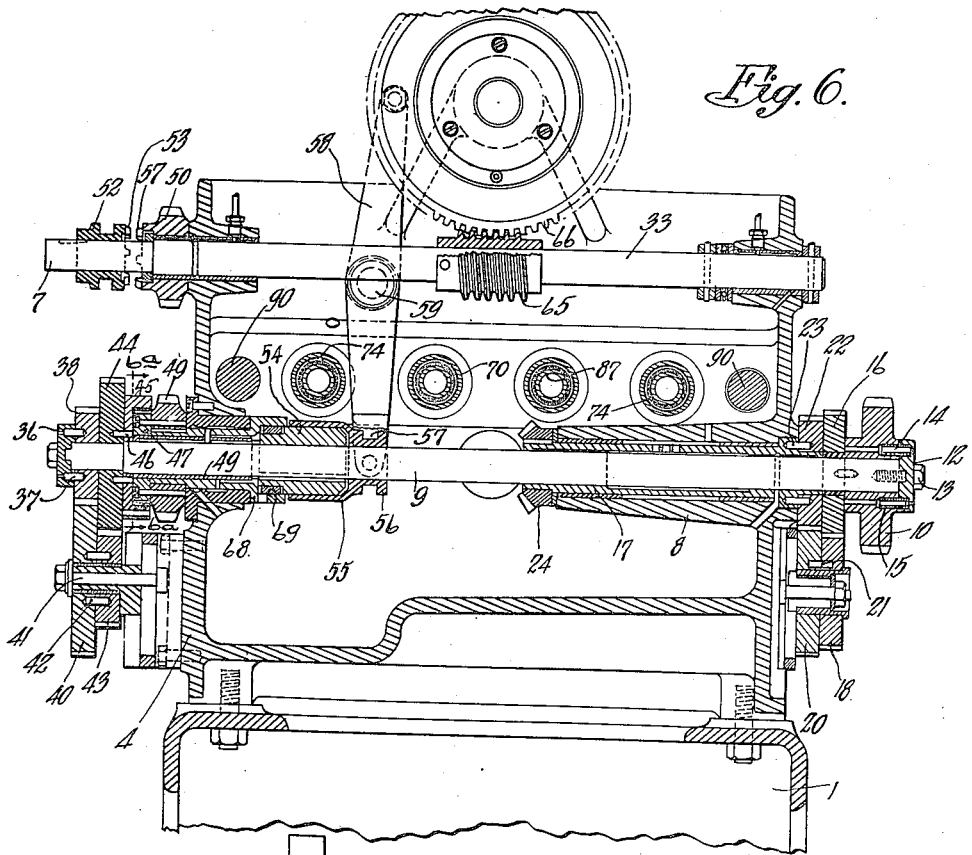

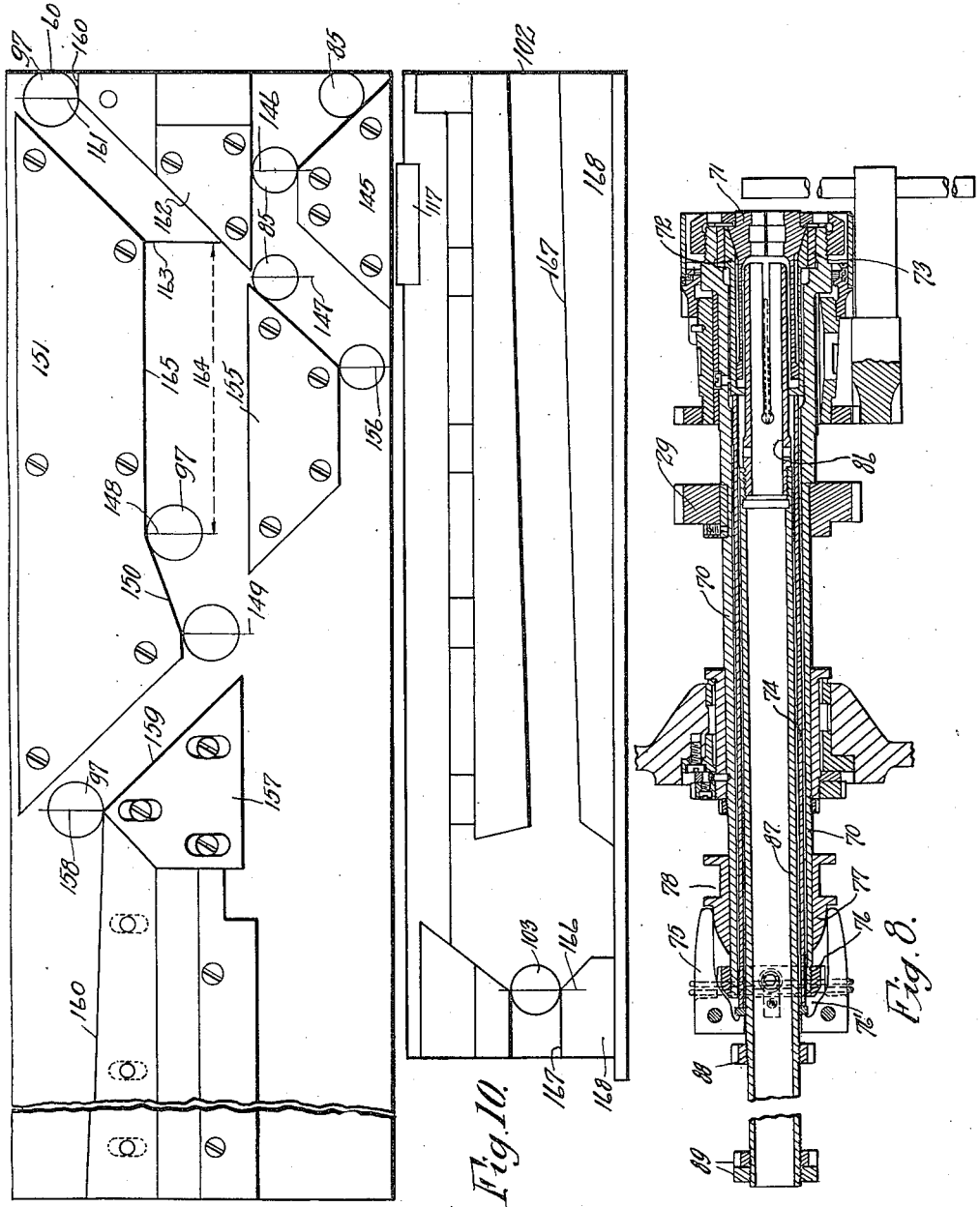

Patented Sept. 11, 1923.

1,467,304

UNITED STATES PATENT OFFICE.

JOHN J. BOSSHARD, OF CHICAGO, ILLINOIS, ASSIGNOR TO THE HILL PUMP VALVE COMPANY, OF CHICAGO, ILLINOIS.

AUTOMATIC SCREW MACHINE.

Application filed July 23, 1920. Serial No. 398,346.

*To all whom it may concern:*

Be it known that I, JOHN J. BOSSHARD, a citizen of the United States, residing at Chicago, 4601 Belmont Ave., % The Hill Pump Valve Company, in the county of Cook and State of Illinois, have invented new and useful Improvements in Automatic Screw Machines, of which the following is a specification.

The invention relates to automatic screw machines and more particularly to nut blanking machines.

It is an object of the invention to provide a machine which is distinguished by a high degree of efficiency, an increased capacity and great durability.

A further object aims at the provision of a machine which is easily accessible and in which the operating parts are arranged within the frame so that the finished product—the nut blanks—may be conveniently received in a container placed at the front or discharge end of the machine.

Another object constitutes the provision of a multi-spindle machine, with the spindles arranged in a common horizontal machine and rotating in the same direction thus requiring only one set of drills for forming the center bore in the nut blank.

A further object constitutes the provision of the cam drums for stock feed and tool slide drums with their cams on top of the machine to afford convenient access thereto.

It is a further object to provide a work stop adapted to be placed in the path of the moving stock and constituting an abutment to maintain the forward ends of the bars in alignment.

A still further object aims at providing a plurality of abutments capable of rotating with the rotating stock bars, whereby the impact due to the engagement between the rotating bars and the abutments is rendered harmless.

Another object aims at the provision of adjustable means for actuating the tool slides carrying the forming and cut off tools whereby the cutting depth can be adjusted to conform to the thickness of the stock bars.

It is also an object to provide a machine of the kind specified, which has its various shafts and gearing enclosed in the frame or arranged at the sides of the frame so that the ends of the machine permit close approach by the operator and arrangement of receptacle to receive therein the finished nut blanks.

To the accomplishment of the foregoing and related ends, the invention then consists of the means hereinafter described and particularly pointed out in the claims; the annexed drawings and the following description setting forth in detail certain mechanism embodying the invention which, however, constitute but one of the various ways in which the principle of the invention may be used.

Figures 4, 4A:
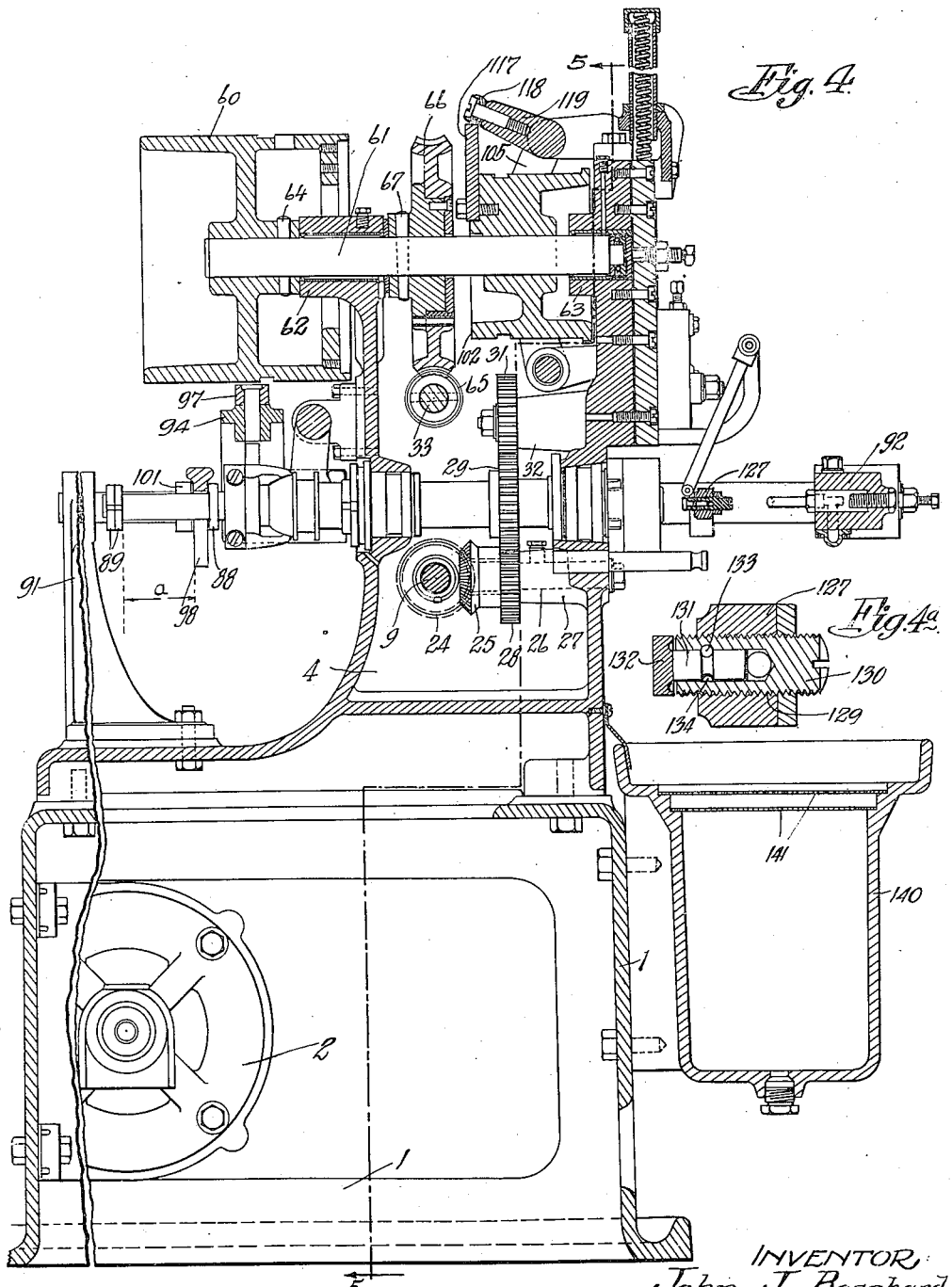
Fig. 4 is a longitudinal section, the section being taken on line 4—4 of Fig. 5.

Fig. 4ª is a detail cross section through the work stop.

Fig. 5 is a cross section on the line 5—5 of Fig. 4.

Fig. 6 is a further cross section through the machine, the section being taken along the main drive shaft.

Fig. 6ª is a detail section on the line 6ª—6ª of Fig. 6.

Figure 1:
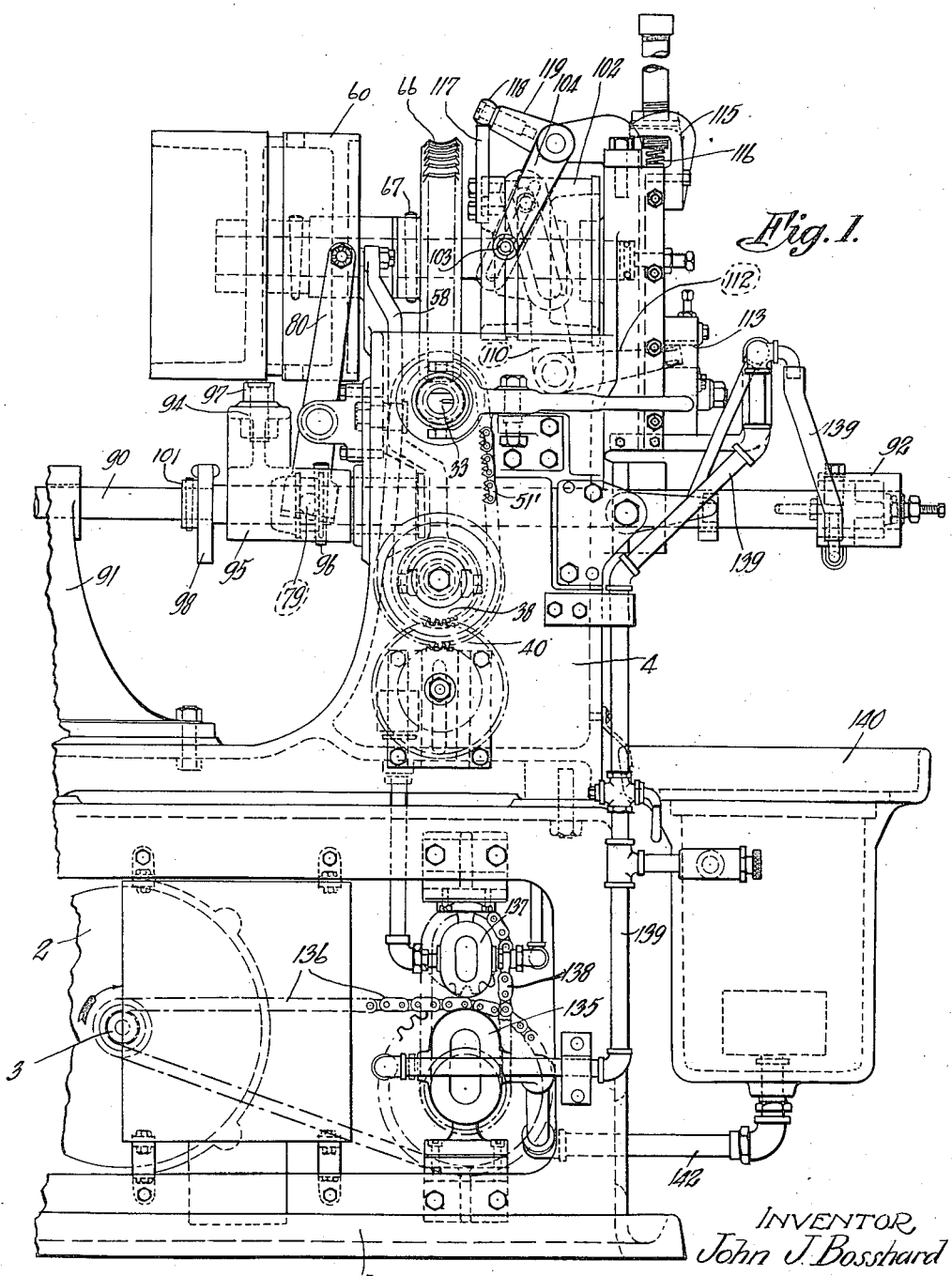
Fig. 1 is a side view of the complete machine.
Figure 2:
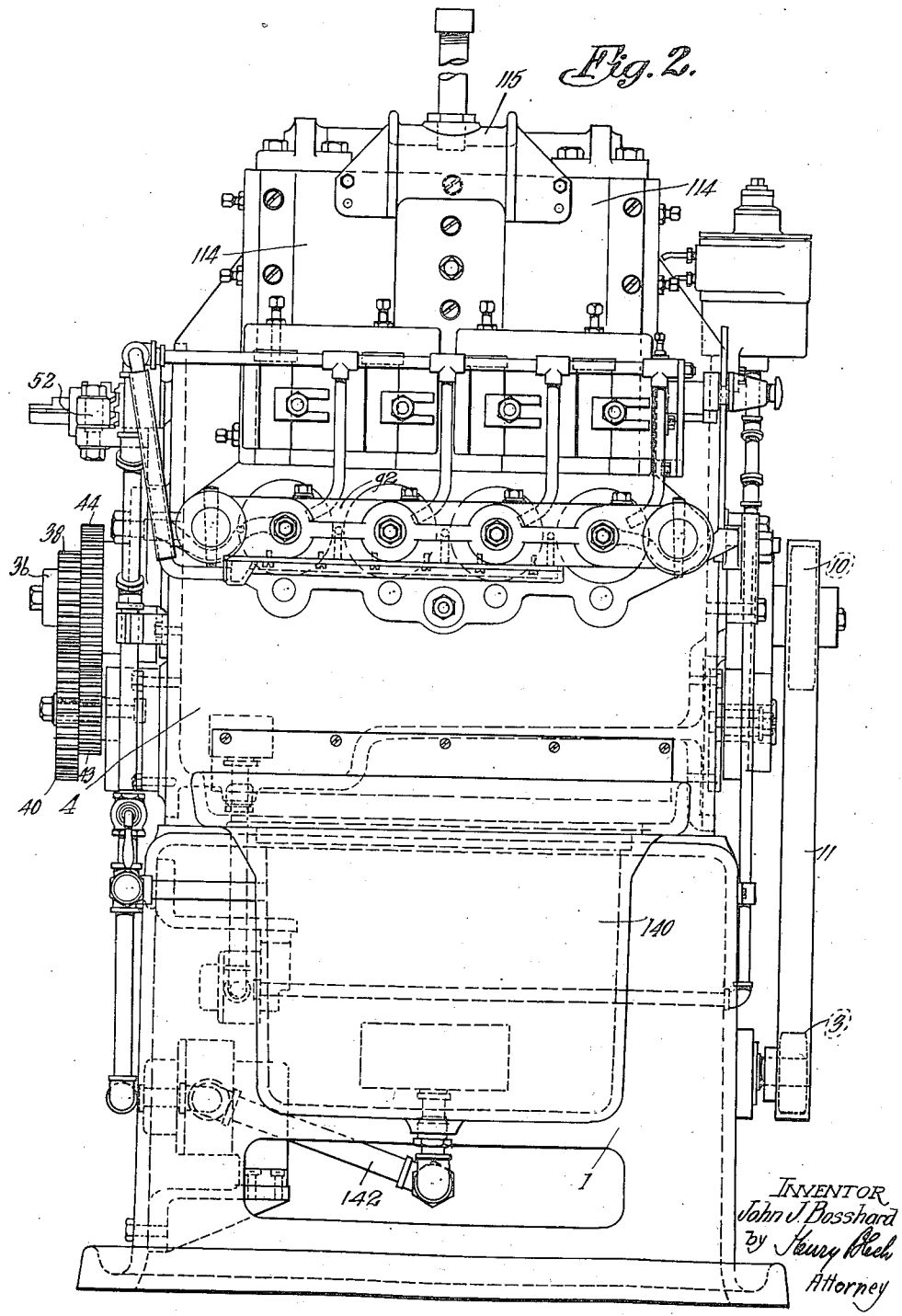
Fig. 2 is a front view of the machine.

Fig. 7 is a fragmentary side elevation of the upper part of the machine viewed from the side opposite to that of Fig. 1.

Fig. 8 is a detail longitudinal section through a spindle for feeding and rotating the stock bar.

Fig. 9 is a developed view of the main drum, and

Fig. 10 is a developed view of the drum actuating the tool slides.

The description of the machine is merely directed to those features which are necessary for an understanding of the present invention.

Referring to the several views of the drawings: 1 designates the frame of the machine, in the interior of which a motor generally denoted by 2 is suitably fastened having a sprocket wheel 3 on its shaft. Secured to the frame 1 is an upper frame 4 having side walls 5 and 6. The side wall 5 is formed with a bearing 7 and an elongated bearing 8 is cast integral with the side wall 6 and in an alignment with the companion bearing 7. A shaft 9 is journaled in bearings 7 and 8 and projects beyond the bearing 8 to carry a sprocket wheel 10 in alignment with the motor sprocket 3. A sprocket chain 11 encompasses the sprockets 3 and 10. An end disk 12 is secured to the end face of the shaft 9 by a screw 13 and pins 14 surrounded by shearing bushings 15 constitute connections between the disk 12 and sprocket wheel 10. A spur gear 16, loosely arranged on a sleeve 17 surrounding the shaft 9 meshes with a spur gear 18 arranged on a stud 19. The gear 18 is secured to a companion gear 20 by dowel pins 21 and the latter gear meshes with a gear 22 which is connected by dowel pins 23 with an enlarged portion of the sleeve 17. Thus it will be seen that drive is imparted from the motor to the shaft 9 and to the sleeve 17 by a train of gearing 16, 18, 20 and 22. The innermost end of the sleeve 17 is provided with a bevel gear 24 meshing with a bevel gear 25 arranged on a stub shaft 26 journaled in a bearing 27 provided on the inner side of the front wall of the upper frame 4. A spur gear 28 is rigidly secured to the shaft 26 and meshes with spur gears 29 which are provided in transverse alignment on two central spindles generally designated by 30. Each gear 29 is in mesh with an idler gear 31 arranged on a stub shaft provided in a bearing 32 and each idler gear 31 meshes with an outer gear 29.

From the foregoing follows that the gears 29 and therewith the spindles are rotated in the same direction of rotation for a purpose hereinafter further specified.

From the drive shaft 9 rotation is transmitted to a cam drive shaft 33 journaled in bearings 34, 35 provided respectively on the side wall of frame 4 and arranged in vertical alignment with the main drive shaft 9. As indicated in Fig. 6 a disk 36 is bolted to the left end face of shaft 9 and a plurality of dowel pins 37 interconnect said disk with a spur gear 38 loosely arranged on shaft 9. Gear 38 meshes with a spur gear 40 rotating on a stud 41. Dowel pins 42 establish connection between gear 40 and another gear 43 also rotatably arranged on stud 41. The gear 43 meshes with a toothed wheel 44 loose on shaft 9. A casing 45 is secured to the inner face of the toothed wheel 44 by a plurality of dowel pins 46. The casing is equipped with a plurality of pawls 47 (Fig. 6ª) which are in engagement with a ratchet wheel 48 loose on a bushing surrounding the end of shaft 9. The ratchet wheel 48 is bolted to a sprocket wheel 49 also loose on the bushing. The sprocket wheel 49 is in vertical alignment with a sprocket wheel 50 loosely surrounding the cam drive shaft 33 and formed at the outer face with clutch jaws 51. A sprocket chain 51' encompasses sprocket wheels 49, 50 and thereby transmits rotation from the drive shaft 9 to the cam drive shaft 33. The latter has splined thereon a clutch sleeve 52 formed at its face opposing the sprocket wheel 50 with clutch jaws 53 which upon displacement of the sleeve interengage with the jaws 51 of sprocket wheel 50 whereby the latter is coupled with the cam drive shaft.

The rotation of the cam drive shaft is slower than that of the main drive shaft 9 by reason of the ratio of the gear train interposed therebetween.

In order to accelerate rotation of the cam drive shaft, such as is necessary to reduce the time necessary for completing idle movements, as will hereinafter appear a clutch known in the art as a Johnson clutch is provided.

As shown in Fig. 6, a hub 54 is keyed to shaft 9 and the inner end of the hub is surrounded by a shipper sleeve 55 which is formed with a hub portion 56 loosely surrounding the shaft 9 and formed with an annular groove 57. The forked end of a lever 58 has pins extending into said groove. The lever is pivotally secured intermediate its ends as at 59 and its upper end bears on a cam drum 60 secured to a shaft 61 journaled in bearings 62 and 63 of the upper frame 4. As shown the drum is keyed to the shaft 61 by a taper pin 64. Motion is imparted to the shaft 61 by a worm 65 secured to cam drive shaft 33 and meshing with a worm wheel 66 keyed to shaft 61 by a taper pin 67. If upon rotation of the cam drum 60 the lever 58 is placed in position shown in Fig. 6, the shipper sleeve 55 occupies its extreme left position and causes a plurality of blocks 67 to enter into frictional engagement with a friction cup 68 which surrounds the bushing 49. The friction cup 68 has the sprocket wheel 49 keyed thereto, so that in the operative position of the Johnson clutch the rotation of main drive shaft 9 is transmitted by hub 54, blocks 69, friction cup 68 and sprocket wheel 49 to the cam drive shaft with undiminished speed.

Attention is called to the fact, that the faster rotation of the sprocket wheel 49 is possible as its ratchet wheel 48 ratchets over the parts 47 of the casing which latter rotates of course in the same direction but with less velocity.

*Stockfeed.*

As indicated four spindles 30 are provided in a common horizontal plane which have the task of feeding the stock from which the nut blanks are formed. As the construction of all spindles is identical a description of one will suffice. The spindle 30 comprises a spindle body 70 on which the spur gear 29 is secured.

Figure 3:
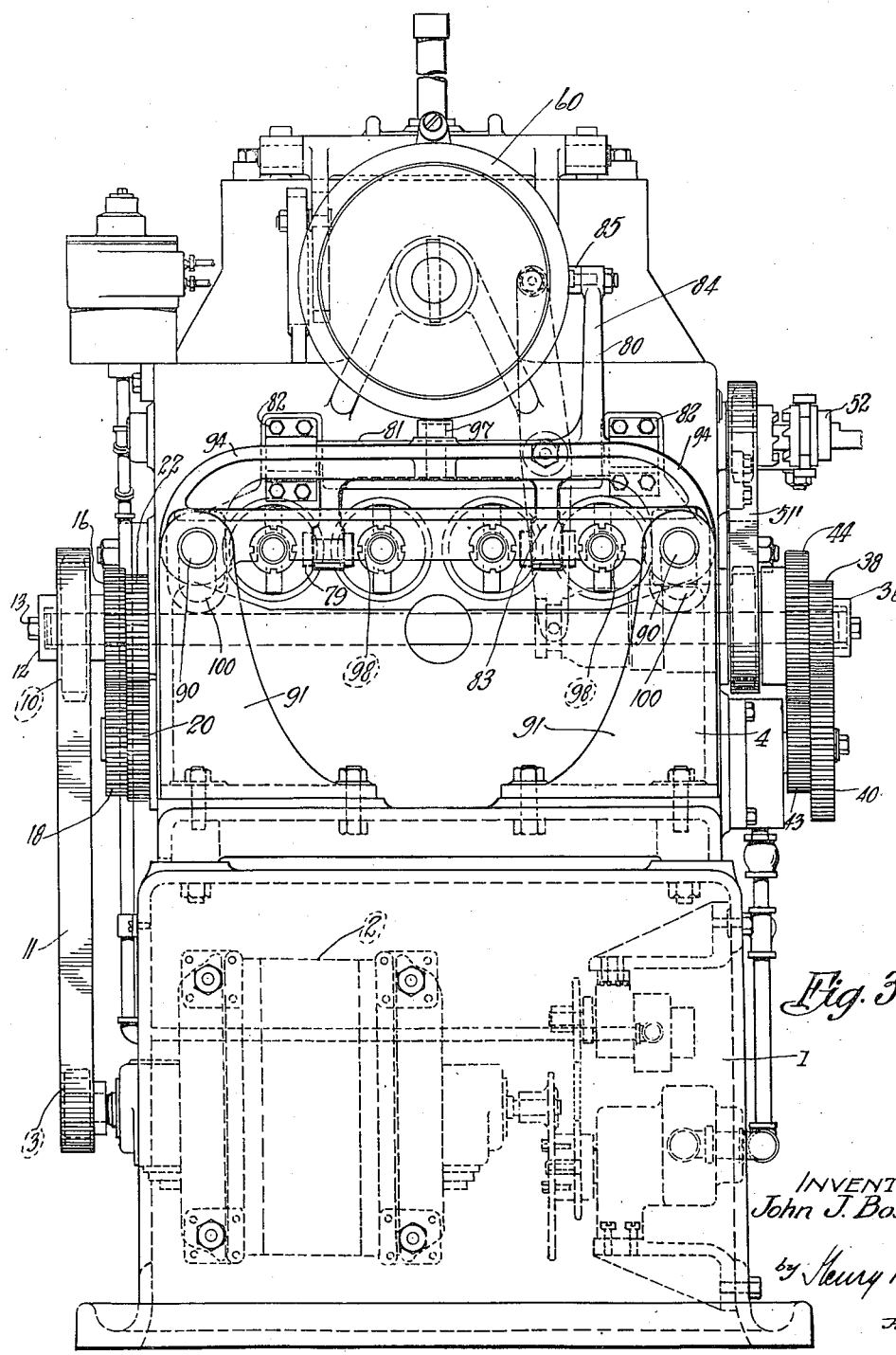
Fig. 3 is a rear elevational view of the machine.

The spindle body carries a split chuck or spring collet 71 which is adapted to grip the hexagonal or otherwise formed stock preparatory to forming the same. The chuck is closed by a sleeve 72 which may be surrounded by a steel lining 73, or if preferred, such lining may be omitted. The chuck as appears from Fig. 8 has a conical end and the sleeve 72 is formed with a complementary conical seat so that upon longitudinal displacement of the sleeve a wedge effect is set up which causes the closing of the chuck and a tight gripping engagement with the stock. The longitudinal displacement of the sleeve is obtained by means of a tube 74 which is acted on by a plurality of fingers 75 pivotally secured between lugs 76' of a collar 76 threaded onto the spindle body 70. The fingers 76 are controlled by an annular wedge member 77 formed with an annular groove 78 into which enter pins 79 of a chuck closing lever generally designated by 80. This lever as appears in Fig. 3, comprises a transverse portion 81 journaled in bearings 82 provided on the rear side of frame 1 and has two downwardly extending arms 83 which enter with the pins 79 into the grooves 78 of the four wedge members 77. At the right end, referring to Fig. 3, the lever 80 has an upwardly extending arm 84 carrying a roller 85 in engagement with the cam drum 60, whereby the lever is actuated to shift the wedge members and thereby move the tube 74, the sleeve 72 and close the clutch; upon the release of fingers 75 the spring action of the chuck reacts to move back the sleeve 72 and this in turn moves back the tube 74.

A feed finger 86 feeds the stock to a work stop hereinafter further referred to and is threadedly secured to a feed tube 87 which is provided with a stop collar 88 and at a distance therefrom with two stop nuts 89.

Parallel to the spindle bodies 30, but to each side thereof is a sliding bar 90 arranged in a bearing 91 bolted to the rear end of the frame 4 and in an aligned bearing provided at the front of the frame. These bars are mounted for horizontal reciprocation and extend beyond the front side of the frame and have secured to their forward ends a transverse member constituting a holder 92 for four drills (not shown) which are adapted to bore holes in the nut blanks as will hereinafter appear.

The sliding bars 90 are interconnected adjacent their rear ends by a transverse yoke 94 which is formed with a hub 95 at its ends to surround the sliding bars. A taper pin 96 secures each hub 95 to its sliding bar. To the central portion of the yoke a roller 97 is secured which is guided by cams on the drum 60. A feed bar 98 (Fig. 3) extends in transverse direction and is provided with four semi-circular cutouts 99 to encompass the spindle bodies 30. At the ends the feed bar is formed with slots 100 through which the sliding bars 90 extend. As appears from Fig. 1, a collar 101 on each sliding bar holds the feed bar 98 in engagement with the stop collars 88 on the feed tubes 87.

Assuming the distance of the feed bar from the stop nuts 89 indicated by $a$ in Fig. 4, to be 3" and the throw of the rollers 97 to be 4", it is clear that during the movement of the roller 97, only 1" is utilized for feeding the bar 98 and therewith the tube 87 to obtain longitudinal displacement of the stock into an engagement with a work stop hereinafter further explained.

The purpose of providing a considerable larger longitudinal movement of the sliding bars and drill holder than is necessary for feeding the stock bars is to provide necessary clearance for the introduction of a work stop against which the stock bars abut at the end of the forward feeding movement as will presently appear.

Forwardly of the worm wheel 67 another cam drum 102 is fast on the shaft 61. A roller 103 on a depending lever arm 104 of a U-shaped yoke is in engagement with a cam on the drum 102. The other arm 105 (Fig. 5) has a slot 106 in which a pin 107 can be adjusted in accordance with the required cutting depth whereby the nut blanks are cut off from the stock bars. The pin 107 carries a roller 108 fitting in a slot 109 of a rocker arm 110 fast on a rock shaft 111 journaled in bearings provided on the side walls 5 and 6 of upper frame 4. To the shaft 111 arms 112 are secured and these arms enter openings 113 (Fig. 1) of a pair of tool slides 114 secured to a cross member 115 resiliently supported by a spring 116.

The raising of the tool slides is accomplished by a cam 117 on the drum 102 engaging a roller 118 of an arm 119 projecting from the U-shaped yoke.

From the foregoing it follows that the movement of the lever arm 104 to the right as viewed in Fig. 1, the tool slides are unitarily lowered, whereas upon engagement of the cam 117 with the arm 118 and consequent movement of the lever arm 104 toward the left hand side, the slides are raised into inoperative or idle position.

The extent to which the tool slides, carrying the forming and cut off tools for the blank nuts are lowered may be varied by adjustment of the pin 107, as previously explained.

To the frame a boss 120 is secured having a pivot pin 121 at the outer end to swingingly hold an arm 122 which receives in an opening a pin 123 laterally projecting from the tool slide 114. The free end of the arm 122 receives a sleeve 124 through which passes a link 125. The other end of the link is pivotally secured to the work stop generally designated by 126 and comprising a transverse bar 127 which terminates at its ends in end portions 128 pivotally secured to the frame. Upon movement of the tool slides 114 in downward or upward direction, a like movement is imparted to the work stop as will be readily understood.

Referring particularly to Fig. 4ª, it will be seen that the transverse bar 127 receives in threaded openings 129 screws 130 which are arranged in alignment with the stock feeding spindles. The screws 130 are provided with a bore to receive the shanks 131 of rollers 132. A pin 133 extends through a bore in the screw 130 and is arranged in a circumferential groove 134 of the roller shank, locking the latter against longitudinal movement but permitting rotary movement thereof.

Accordingly when the stock bars are fed forward they engage with the rollers 132 which participate in the rotary movement of the stock bar and thus injury due to the impact of the stock bars against the stop is obviated. The work stop constitutes a gauge for maintaining the stock bars in alignment at the forward ends and thus insures the production of nut blanks of the proper length.

The oiling system provided for the machine includes a pump 135 (Fig. 1) driven from the motor 2 by a sprocket chain 136. An auxiliary pump 137 is driven by a sprocket chain 138 from the main pump 135. The latter feeds oil through piping 139 to the drills. The oil drops together with the finished blanks into a container (not shown) having a perforated bottom. The oil flows then into the receptacle 140, in which a plurality of superposed foraminous plates 141 are provided to retain filings, shavings and the like but permitting the filtered oil to collect at the bottom of the receptacle whence it is drawn through the pipe 142 into the pump 135 for further circulation.

The auxiliary pump 139 supplies oil to the various bearings through piping 143.

As the oiling system does not form a part of the present invention further reference thereto is deemed unnecessary.

Operation.

To arrive at an understanding of the proper sequence of the various phases of operation reference is made to Figs. 9 and 10 showing diagrammatically developed views of cam drums 60 and 102 respectively. Bearing in mind that rollers 85 of chuck opening and closing lever 80 is offset 90° from roller 97 of the feed yoke 94, as appears in Fig. 1, it will be understood that as roller 85 rides on cam 145 whereby the chuck is opened the roller 97 must cause feeding of the stock bars. Thus the roller 85 comes into the position 146 and until it reaches the position 147 the chuck remains fully open. When roller 146 is in position 146, the roller 97 of yoke 94 which connects the sliding bars 90 is in position 148, 90° apart from position 146. While roller 85 moves from position 146 to 147, in which the chuck is open, roller 97 travels from position 148 to 149 during which time by virtue of the slope 150 of cam 151 drills are removed and stock is fed forwardly at the same time. Cam 155 forces the roller 85 forwardly into position 156 and closes the chuck, after which cam 157 adjustably secured to the drum 60 moves roller 97 together with yoke 94 and sliding bars 90 to the working position 158 by virtue of the engagement of roller 97 with the slope 159. The gradually slanting edge 160 slowly forces the roller 97, parts 94 and 90 and the drills rearwardly which upon engagement with the rotating stock bars drills holes in the nut blanks. This drilling operation continues until roller 97 reaches position 161 where the cam 162 removes roller 97 to position 163. Roller 97 then dwells on the edge 165 of cam 151 for the distance 165. During this engagement the roller 103 of lever arm 104 controlling the tool slide 114 moves from position 166 along the working face 167 of cam 168 on the drum 102 for the actual forming and cutting off operation. Before however the roller 103 reaches the position 166 the cam 117 engages the roller 118 of arm 119, to raise the tool slides and to bring the stop 126 into functional position at which time as pointed out the stock is fed to the stop and the chuck is closed.

The invention has been described in a preferred embodiment, but departures are included within the purview of the invention as defined in the appended claims.

I claim:

1. In a machine of the character described, a frame, a plurality of spindles in said frame adapted to feed and rotate stock bars and arranged in a common horizontal plane, vertically reciprocating tool slides adapted to act on the forward ends of said bars, means for imparting rotation to said spindles, means arranged above said spindles for actuating said spindles and tool slides and a drive shaft concentric with said first named means, for imparting movement to said actuating means.

2. In a machine of the character described, a plurality of spindles adapted to feed and rotate stock bars and arranged in a common horizontal plane, vertically reciprocating tool slides adapted to act on the forward ends of said bars, a main drive shaft, and means concentric with said shaft for imparting to said spindles rotation in the same direction.

3. In a machine of the character described, a frame, a plurality of spindles in said frame adapted to feed and rotate stock bars and arranged in a common horizontal plane, a vertically reciprocating tool slide adapted to act on the forward ends of said bars, a plurality of cam drums arranged above said spindles and actuating said spindles and tool slides, a drive shaft and means concentric with said shaft and imparting rotation to said spindles.

4. In a machine of the character described, a frame, a plurality of spindles adapted to feed and rotate stock bars in the same direction, a reciprocating tool slide, adapted to act on the forward ends of said bars, and a plurality of cam drums arranged above said spindles and actuating said spindles and tool slides, a main drive shaft, means for transmitting rotation from said shaft to said cam drums and means concentric with said shaft for rotating said spindles.

5. In a machine of the character described, a plurality of spindles in said frame adapted to feed and rotate stock bars and arranged in a common horizontal plane, a holder, a plurality of drills on said holder adapted to bore holes in said stock bars, means above said spindles for reciprocating said drill holder to bring said drills into and out of operative position, and a lost motion connection between said drill holder and spindles including a single element for the spindles whereby the latter are advanced to feed the stock bars.

6. In a machine of the character described, a plurality of spindles adapted to feed and rotate stock bars and arranged in a common horizontal plane, a holder frame mounted for horizontal reciprocation, a plurality of drills mounted on said frame and adapted to bore axial holes in said stock bars, means for reciprocating said drill holder to a considerable extent to obtain intermittently a large clearance between said drills and stock bars, and a lost motion connection between said drill holder and spindles, whereby the latter are advanced only during a small portion of the holder movement to feed the bars.

7. In a machine of the character described, a frame, a plurality of spindles in said frame adapted to feed and rotate stock bars and arranged in a common horizontal plane, a holder mounted in said frame for horizontal reciprocation, a plurality of drills mounted on said holder and adapted to bore axial holes in said stock bars, means provided above said spindles for imparting reciprocation to said drill holder to a considerable extent to obtain intermittently a large clearance between said drills and stock bars, and a lost motion connection between said drill holder and spindles including a single element for such spindles whereby the latter are advanced only during a small portion of the holder movement to feed the bars.

8. In a machine of the character described, a frame, a plurality of spindles in said frame adapted to feed and rotate stock bars and arranged in a common horizontal plane, a holder mounted in said frame for horizontal reciprocation, a plurality of drills mounted on said holder and adapted to bore axial holes in said stock bars, cam drums provided above said spindles for imparting reciprocation to said drill holder to obtain intermittently a large clearance between said drill and the stock bars, a lost motion connection between said drill holder and spindle whereby the latter are advanced only during a small portion of the holder movement to feed the bars, vertically reciprocating tool slides adapted to act on the forward ends of said bars and actuated by said drums and means for pushing said slides into engagement with the bars.

9. In a machine of the character described, a plurality of spindles adapted to rotate and feed stock bars to the forward end of the machine, means for drilling axial holes in the forward ends of said bars, vertically reciprocating tools arranged at the forward end of the machine and adjustable means for pushing said tools into engagement with the bars.

10. In a machine of the character described, a plurality of spindles adapted to feed and rotate stock bars, vertically reciprocating tools to act on the forward ends of said bars and pivotally arranged means concomitantly moving with said tools for positively arresting the stock bars at the end of each feed movement.

11. In a machine of the character described, a plurality of spindles adapted to feed and rotate stock bars, vertically reciprocating tools to act on the forward end of said bars and rotary means moving in arcuate paths for positively arresting the stock bars at the end of each feed movement, said tools causing shifting of said means into and out of operative position.

12. In a machine of the character described, a plurality of spindles adapted to feed and rotate stock bars, vertically reciprocating tools to act on the forward ends of said bars, and an oscillatorily mounted abutment limiting the feed movement and thereby aligning the stock bars, said tools causing oscillation of said abutment.

13. In a machine of the character described, a plurality of spindles adapted to feed and rotate stock bars, vertically reciprocating tools to act on the forward ends of said bars, and a plurality of rotary abutments oscillatorily mounted for limiting the feed movement and thereby positively arresting the stock bars in alignment, said tools causing oscillation of said abutment.

14. In a machine of the character described, a plurality of spindles adapted to feed and rotate stock bars, vertically reciprocating tools to act on the forward ends of said bars, and a lever yoke pivotally secured and adapted to be moved, into the path of the stock bars by said tools to positively arrest the same at the completion of the feed movement.

15. In a machine of the character described, a plurality of spindles adapted to feed and rotate stock bars, vertically reciprocating tools to act on the forward ends of said bars, and a lever yoke provided with a plurality of abutments caused to be swung into the path of the stock bars by said tools to positively arrest same at the completion of the feed movement.

16. In a machine of the character described, a frame, a plurality of spindles adapted to feed and rotate stock bars and arranged in a common horizontal plane, vertically reciprocating tools to act on the forward ends of said bars, and means actuated by said tools and pivotally secured to said frame for aligning the stock bars at the end of each feed movement.

17. In a machine of the character described, a frame, a plurality of spindles adapted to feed and rotate stock bars and arranged in a common horizontal plane, vertically reciprocating tools to act on the forward end of said bars, and rotary means actuated by said tools and pivotally secured to said frame for aligning the stock bars at the end of each feed movement.

18. In a machine of the character described, a plurality of spindles adapted to feed and rotate stock bars and arranged in a common horizontal plane, vertically reciprocating tools to act on the forward ends of said bars, and rotary means for aligning the stock bars at the end of each feed movement, said rotary means being adapted to be swung into and out of operative position by said tools.

19. In a machine of the character described, a plurality of spindles adapted to feed and rotate stock bars and arranged in a common horizontal plane, vertically reciprocating tools to act on the forward ends of said bars, and pivotally arranged rotary means oscillated by said tools for aligning the stock bars at the end of each feed movement.

20. In a machine of the character described, a plurality of spindles adapted to feed and rotate stock bars and arranged in a common horizontal plane, vertically reciprocating tools to act on the forward ends of said bars, and an abutment moving in an arcuate path concomitantly with said tools for limiting the feed movement and thereby aligning the stock bars.

21. In a machine of the character described, a plurality of spindles adapted to feed and rotate stock bars and arranged in a common horizontal plane, vertically reciprocating tools acting on the forward ends of said bars, and a plurality of rotary abutments moving in an arcuate path concomitantly with said tools for limiting the feed movement and thereby aligning the stock bars.

22. In a machine of the character described, a plurality of spindles adapted to feed and rotate stock bars and arranged in a common horizontal plane, vertically reciprocating tools acting on the forward end of said bars, and a lever yoke pivotally secured and caused by said tools to swing into the path of the stock bars to positively arrest the same at the completion of the feed movement.

23. In a machine of the character described, a frame a plurality of spindles adapted to feed and rotate stock bars, vertically reciprocating tool slides adapted to act on the forward ends of said bars, and means pivotally secured to said frame and actuated by said slides for positively arresting the stock bars at the end of each feed movement.

24. In a machine of the character described, a frame, a plurality of spindles adapted to feed and rotate stock bars, and arranged in a common horizontal plane, vertically reciprocating tool slides adapted to act on the forward ends of said bars, and means pivotally secured to said frame and actuated by said slides for positively arresting the stock bars at the end of each feed movement.

25. In a machine of the character described, a plurality of spindles adapted to feed and rotate stock bars, vertically reciprocating tools adapted to act on the forward ends of said bars, and pivotally arranged means actuated by said slides to be swung into the path of the stock bars to positively arrest the same at the completion of the feed movement.

26. In a machine of the character described, a frame, a main drive shaft, a plurality of spindles geared to said main drive shaft for rotation, a cam shaft, a plurality of drums keyed to said cam shaft, means for transmitting rotation from said main drive shaft to said cam shaft, a holder mounted for horizontal reciprocation, a plurality of drills on said holder, said cam drums imparting reciprocation to said drill holder, a lost motion connection between said drill holder and spindles including a single element for the latter, and vertically reciprocating tool slides adapted to act on the forward ends of said bars, said shafts, tool slides and drums being arranged above said spindles to prevent the product, chips or machine oil from striking said parts.

27. In a machine of the character described, a frame, a plurality of spindles adapted to feed and rotate stock bars, vertically reciprocating tools adapted to act on the forward ends of said bars, adjustable means for actuating said tools, and means associated with said tools for positively arresting the stock bars at the completion of the feed movement.

In witness whereof I affix my signature.

JOHN J. BOSSHARD.